H. C. BAILEY.
STARTING DEVICE FOR EXPLOSION ENGINES.
APPLICATION FILED JULY 12, 1907.

920,411.

Patented May 4, 1909.
5 SHEETS—SHEET 1.

H. C. BAILEY.
STARTING DEVICE FOR EXPLOSION ENGINES.
APPLICATION FILED JULY 12, 1907.

920,411.

Patented May 4, 1909.
5 SHEETS—SHEET 3.

Witnesses
Ville A. Burrows
Augustus B. Copper

Inventor
Howard C. Bailey
by his Attorneys,
Howson & Howson

H. C. BAILEY.
STARTING DEVICE FOR EXPLOSION ENGINES.
APPLICATION FILED JULY 12, 1907.

920,411.

Patented May 4, 1909.
5 SHEETS—SHEET 4.

Witnesses:—
Willis A. Burrowes
Augustus B. Copps

Inventor
Howard C. Bailey
by his Attorneys
Howson & Howson

UNITED STATES PATENT OFFICE.

HOWARD C. BAILEY, OF PHILADELPHIA, PENNSYLVANIA, ASSIGNOR TO ELSIE L. BAILEY, OF PHILADELPHIA, PENNSYLVANIA.

STARTING DEVICE FOR EXPLOSION-ENGINES.

No. 920,411.  Specification of Letters Patent.  Patented May 4, 1909.

Application filed July 12, 1907. Serial No. 383,463.

*To all whom it may concern:*

Be it known that I, HOWARD C. BAILEY, a citizen of the United States, residing in Philadelphia, Pennsylvania, have invented certain Improvements in Starting Devices for Explosion-Engines, of which the following is a specification.

One object of my invention is to provide a device whereby with the expenditure of but little physical exertion it shall be possible to give to an explosion engine the partial revolution necessary to cause it to start; it being particularly desired that the device shall be relatively simple and uncomplicated, as well as of such a nature as to be conveniently operated from the driver's seat when employed in connection with a motor vehicle.

I further desire to provide a device for starting explosion engines whereby simultaneously the movement of the crank shaft of the engine shall open the relief valve or valves in the engine cylinders in order to permit the further operation of the device necessary to properly start the engine.

These and other advantageous ends I attain as hereinafter set forth, reference being had to the accompanying drawings, in which:—

Fig. 12, is a side elevation illustrating a modified form of my invention; Fig. 13, is a side elevation on a larger scale than Fig. 12, illustrating the detail construction of the catch and throw-off mechanism employed in that form of my device shown in said latter figure; Fig. 14, is an end elevation of the structure shown in Fig. 13, and Fig. 15, is a plan of the notched segment for holding the operating lever.

In the above drawings A and A' represent the two cylinders of an engine whose main shaft is shown at B. Said shaft passes through a radiator C and has an independent section B' which may be connected to it under certain conditions of operation by an automatic clutch mechanism $b$. While said mechanism may be of any desired construction, it is preferably made as described and illustrated in an application for U. S. Patent filed by me under date of May 18, 1907, Serial Number 374,508; its parts being so arranged that as long as the speed of the main part of the shaft is in excess of that of the section B', said two sections are operatively independent of each other. When, however, the speed of the section B' of the shaft is greater than the speed of the main shaft, then said clutch will automatically couple the two shaft sections so that the main part may be turned from said section B'. This latter part of the shaft is provided with an enlarged end $b'$ having an irregular recess for the reception of the similarly shaped end $b^2$ of the well known starting crank $b^3$ and in addition has loosely mounted on it a pulley wheel D. Said wheel carries one or more pawls $d$ so placed as to engage the teeth of a ratchet wheel $d'$ fixed in any desired manner to the shaft section B' and in addition has attached to it one end of a spring $d^2$ whose opposite end is fixed to a bracket $d^3$ secured to one of the shaft bearings $d^4$. Said spring is so designed that the wheel D and with it the shaft section B' is free to turn through an arc of about 270°, though it cannot get beyond this and is always returned to a certain definite position by means of said spring. The pawls $d$ and ratchet $d'$ permit turning of the wheel D in but one direction relatively to the shaft section B'. The pulley wheel is preferably grooved as indicated and has fixed to it one end of a wire rope or cable $e$ so arranged that when the wheel is in its normal position under the action of the spring $d^2$, said cable is wound in the groove of the wheel to an extent preferably not less than 180° of the circumference of the wheel.

Figure 1:
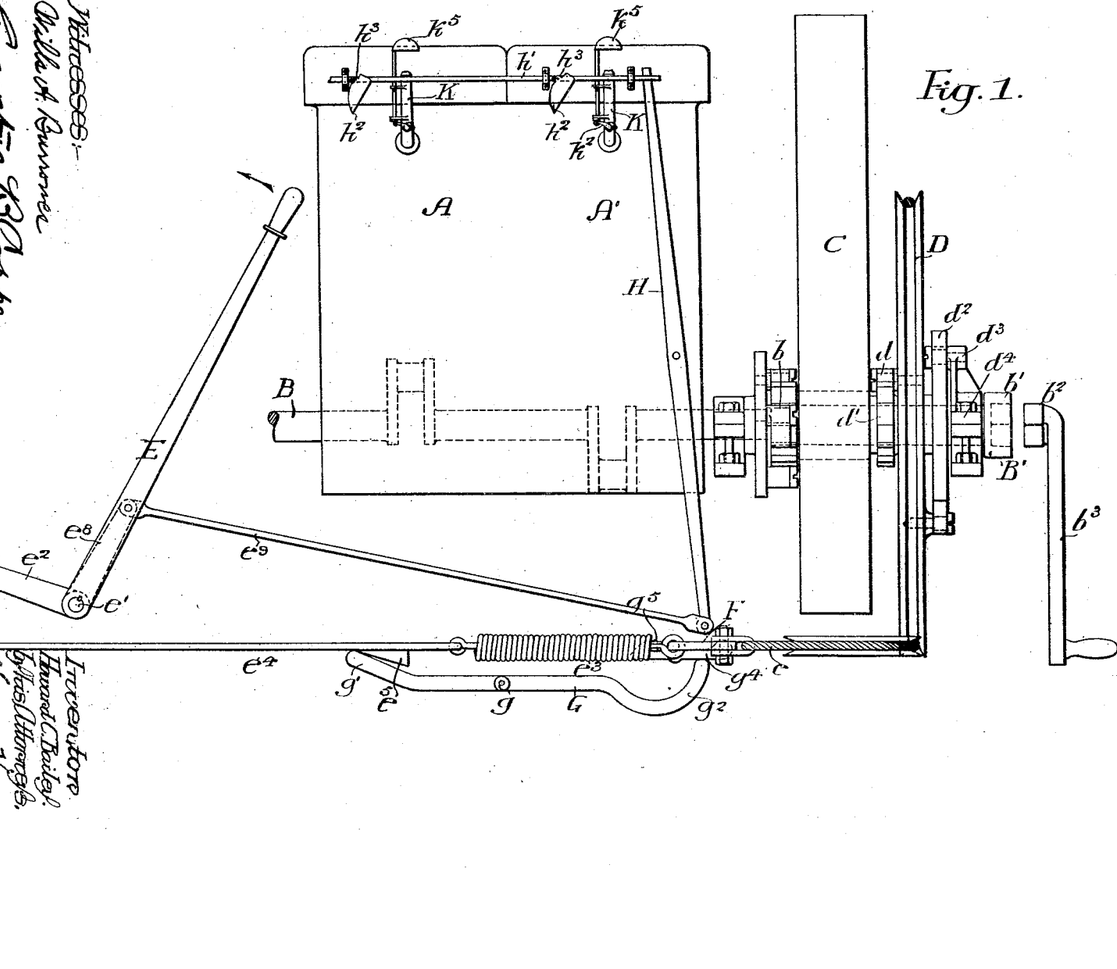
Figure 1, is a side elevation illustrating my invention as applied to a two cylinder engine, there being omitted from said figure a portion of the mechanism connected with the operating lever.
Figures 2, 8:
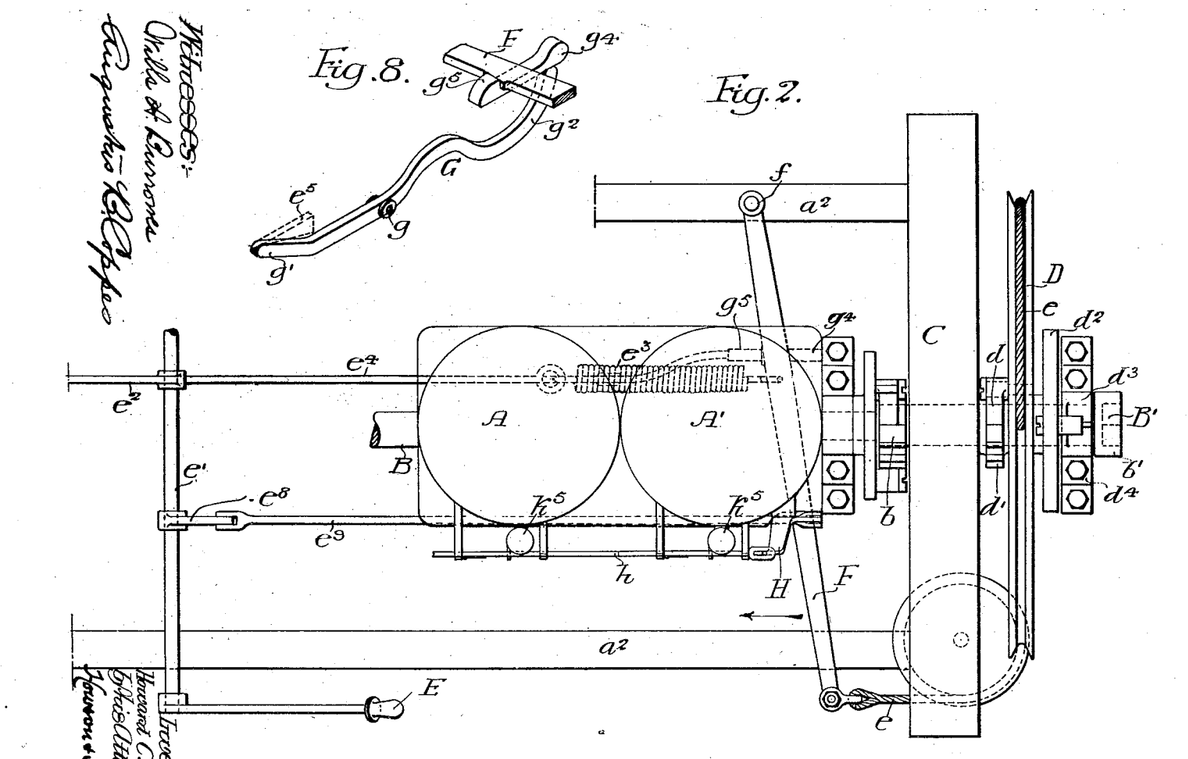
Fig. 2, is a plan of the apparatus illustrated in Fig. 1.
Fig. 8, is a perspective view of the holding latch and its associated parts.
Figure 3:
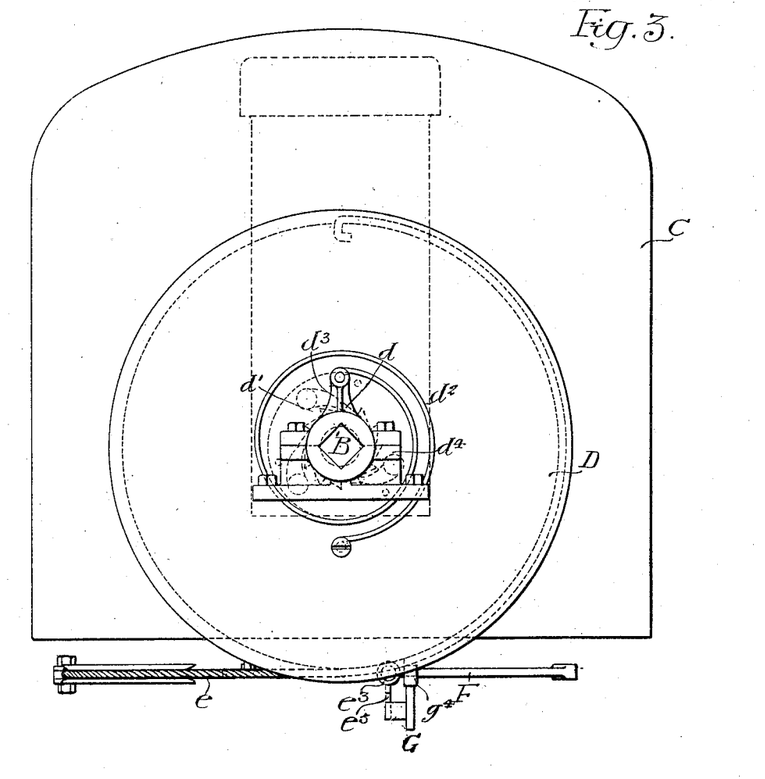
Fig. 3, is an end elevation.

A hand or operating lever E is provided and is so placed that when my device is applied to the engine of a motor vehicle, said lever will extend adjacent to the driver's seat; it being fixed to a transverse shaft $e'$, which, in the present instance, is provided with a projecting arm indicated at $e^2$ in Fig. 1. This latter arm is connected to one end of a link $e^{10}$ whose opposite end is pivotally attached to a block or cross head $n$ in the present instance so as to slide within a casing N supported in any desired manner. Within and having its ends respectively fastened to one end of the casing and to the block or cross head, is a spring $n'$ which is in a normal or unstretched condition when the arm $e^2$ and the link $e^{10}$ are so moved as to lie practically in the same straight line and act as a toggle. When, however, the lever E is in its forward position, the toggle formed by the arm and the link is broken and said spring $n'$ is under tension. The cross head $n$ is also attached through a link $e^4$ to one end of a coiled spring $e^3$ and the second end of this spring is connected to some point on a lever F fulcrumed at $f$ to any suitable supporting structure $a^2$ and having its free end connected in the present instance to one end of the rope or cable $e$. Under the spring $e^3$ is mounted another lever G fulcrumed at $g$ to a suitable support (not shown) and having one of its arms $g'$ extended so as to be capable of engagement with a cam $e^5$ preferably attached to the link $e^4$ which connects said spring $e^3$ with the cross head $n$. The other arm $g^2$ of this lever extends into engagement with or adjacent to one end of a latch or catch $g^4$, supported in a suitable manner and so designed that when the arm $g'$ of the lever G is engaged by a certain portion of the cam $e^5$, it will be caused to turn on its supporting pivot. The latch above noted is constructed as shown in Fig. 8, with its hooked end $g^5$ capable of engaging and holding the lever F from movement under the action of the spring $e^3$ until this latter has been stretched to a predetermined extent, when said latch is so moved on its pivot to cause it to discharge or release said lever F.

When the various parts of the device are at rest in the normal positions shown, and it is desired to start the engine, the movement of the lever E in the direction of the arrow, Fig. 1, will, through the medium of the arm $e^2$, link $e^{10}$, cross head $n$ and link $e^4$, put the spring $e^3$ under tension, the work of moving said lever F being reduced to a certain extent by the spring $n'$. The stretching of the spring $e^3$ would ordinarily at once cause a pull to be exerted on the rope $e$ but owing to the fact that the latch $g^4$ is so constructed as to normally engage and hold the lever F stationary, the above described movement of the lever E merely stretches the spring $e^3$ to a predetermined extent. When finally the link $e^4$ with the cam $e^5$ has been moved for a sufficient distance, it so moves the lever G as to cause it to actuate the latch $g^4$, thereby making this latter disengage the lever F which is then free to move in the direction of the arrow Fig. 2, under action of the spring $e^3$. This movement results in a sudden, relatively powerful, turning effort being exerted on the wheel D through the rope or cable $e$ and inasmuch as the two sections of the engine shaft are coupled through the clutch $b$, the main section is given a sudden turn sufficient to start the operation of the engine. Thereafter the operation of the engine causes said main section of the shaft to be turned at a high speed so that the clutch $b$ automatically disconnects said part of the shaft from the section B'. The lever E is now pushed forward or returned to its normal position and the spring $n'$ is stretched while the spring $d^2$, which by the movement of the wheel D in starting the engine, was wound, now unwinds, thereby moving said wheel D and its associated parts toward their normal positions until the latch $g^4$ again engages the lever F so as to hold the apparatus in the positions illustrated.

Figure 4:
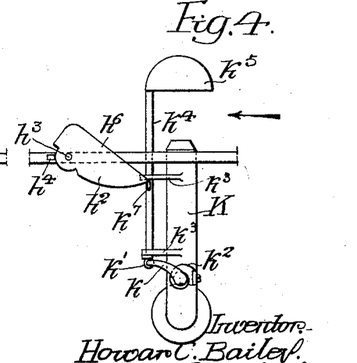
Figs. 4, 5, and 6, are side elevations of one form of valve mechanism which may be used in connection with my invention, illustrating the various parts in the positions occupied at certain times during the operation of my device.
Figure 5:
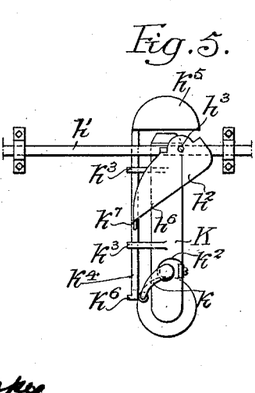
Figure 6:
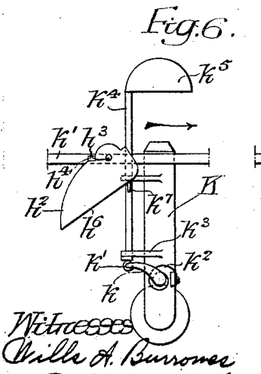

It is obvious that in small engines, the above described operation can be easily carried out in spite of the compression which occurs in the cylinder or cylinders of the engine. For high power engines, however, it is desirable, and in some cases necessary, to automatically relieve the excessive compression in the cylinders and for this purpose I provide means whereby relief valves are automatically opened in the engine cylinders so as to permit of the preliminary turning of the engine shaft necessary in starting. The device is so constructed, however, that said relief valves are automatically closed as soon as the engine is started, or begins to automatically operate. For the purpose of actuating the relief valves, I provide on the shaft $e'$ a second lever arm $e^8$ and connect it through a link $e^9$ to one arm of a lever H, whose other arm is positively connected to a longitudinally movable bar or rod $h'$ extending alongside of the cylinders of the engine. As illustrated in Figs. 4 to 6 inclusive, the bar $h'$ has movable cams $h^2$ pivotally connected to it at $h^3$ so as to be free to swing in a vertical plane. Adjacent to each cam there is on the bar $h'$ a pin or projection $h^4$ whereby revolution of the adjacent cam upon its pivot is prevented beyond a certain point. Each cylinder has a relief valve structure K and to the valve itself (not shown) is fixed an arm $k$, preferably having an anti-friction roller $k'$ at its outer end. A spiral or other suitable spring $k^2$ is so attached to the valve through said arm that it tends to normally maintain it in a closed position, as illustrated in Figs. 4 and 6; being sufficiently powerful to move the arm into this position from the open position.

Each valve structure K is provided with a pair of brackets or lugs $k^3$ serving as guides for a vertically movable bar $k^4$ which serves to support an inverted cup-shaped head $k^5$ immediately over the outlet of the valve. Said bar is enlarged at its lower end as indicated at $k^6$ and has a projecting pin or lug $k^7$ so placed as to coact with the adjacent cam $h^2$. When, therefore, the lever E is moved from the position shown in Fig. 1, to start the engine as above described, it will be seen that it moves longitudinally the rod $h'$ and thereby causes the various parts co-acting with it to move from their normal positions illustrated in Fig. 6. That is to say, the movement of the rod $h'$ in the direction of the arrow at once brings the sloping side or edge $h^6$ of the cams $h^2$ against the pins or lugs $k^7$ of the rods $k^4$ and inasmuch as the pins $h^5$ are so placed on said rod $h'$ as to prevent turning of the cams beyond the position shown in Fig. 6, each rod $k^4$ is forced down by reason of said inclined edge of the cam acting on its pin $k^7$. This downward movement causes a turning of the relief valves so as to open them; the springs $k^2$ being at the same time wound up or placed under stress. By the time, therefore that there would ordinarily be such an amount of compression in the cylinders as would render the manual turning of the engine shaft extremely difficult, the various relief valves are opened sufficiently to permit the escape of a portion of the compressed gas or vapor, when the wheel D is finally turned; there being, however, sufficient gas still remaining in the cylinders to start the engine as soon as it is exploded by the igniting device. When therefore, the engine begins its automatic operation, the first explosion in each cylinder causes a more or less strong puff of gas to be delivered through the relief valve against the underside of its cup-shaped head $k^5$ and this has sufficient power to force the structure upwardly and with it the rod $k^4$ so that the spring $k^2$ is free to automatically turn its valve to the closed position. Thereafter the engine is at liberty to operate in the normal manner. The movement of the rod $h'$ in the direction of the arrow, Fig. 4, when the lever E is returned to its normal forward position, causes the various cams to be drawn over the pins $k^7$ of the rods $k^4$ without depressing the latter; since said cams are free to turn on their pivots into the positions illustrated in the last named figure. The continued movement of the rod $h'$ finally causes the various cams to drop off of the pins $h^7$ and resume positions approximating that illustrated in Fig. 6.

Figures 7, 9:
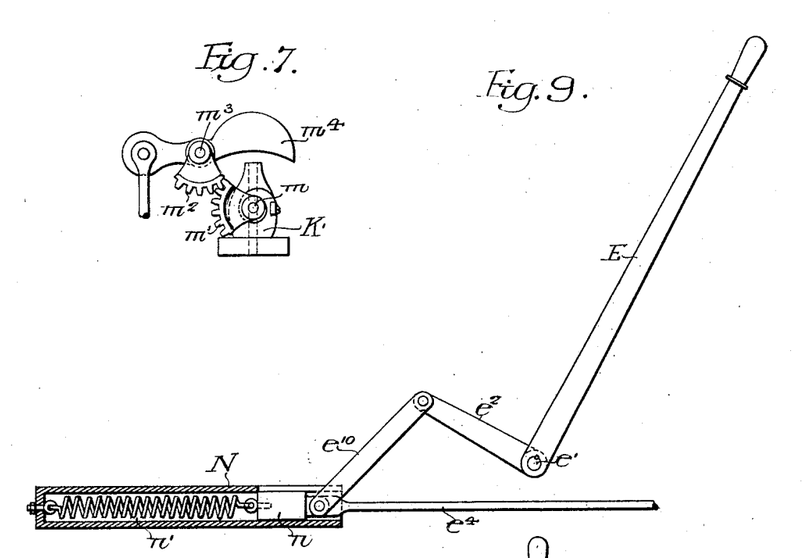
Fig. 7, is a side elevation illustrating another form of valve which may be employed.
Figs. 9 and 10, are vertical sections illustrating that part of the operating mechanism omitted from Fig. 1, showing the various elements in their two extreme positions.

It is obvious that other devices for relieving the compression of the cylinders, when it is desired to start the engine, may be substituted for those shown in Figs. 1, 4, 5 and 6, without departing from my invention; for example, in Fig. 7, I have shown another form of automatic valve which may accomplish the desired results. In this figure the stem $m$ of the valve proper has fixed to it a toothed segment $m'$ meshing with a second toothed segment $m^2$ fixed to a spindle $m^3$. A lever having an inverted cup-shaped arm $m^4$ is also fixed to this spindle in such manner that said arm will be immediately over the outlet of the valve structure K'. By any desired means the various parts of this device may, when it is desired to start the engine, be brought into the positions illustrated and therefore the first explosion which takes place causes gas to be forcibly delivered to the cup-shaped arm $m^4$ so as to turn the spindle $m^3$ and with it the segment $m^2$. The segment $m'$ is therefore necessarily turned through an angle of about 90°, and the relief valve is thereby closed.

Figures 10, 11:
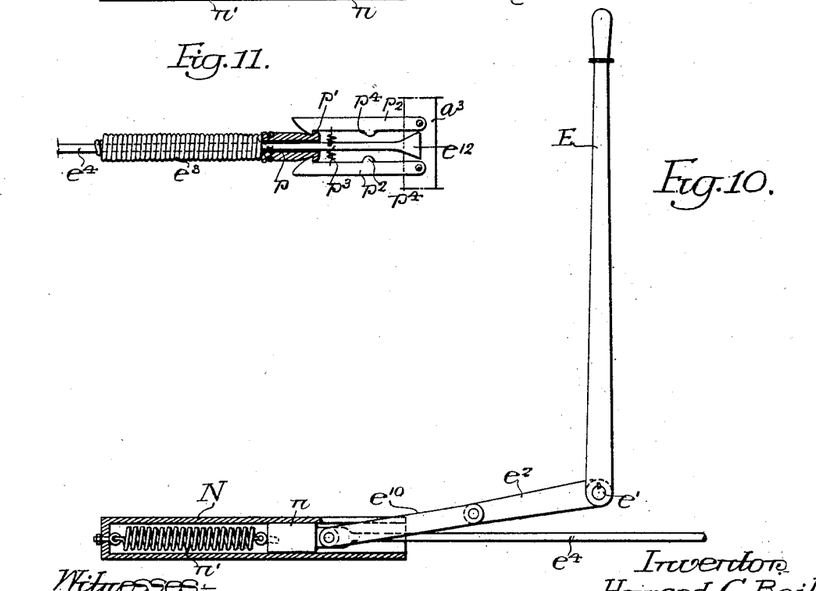
Fig. 11, is a plan partly in horizontal section showing a modification of the spring holding means.

In Fig. 11, I have illustrated a modified form of the device for holding the spring $e^3$ until it has been put under sufficient stress or tension to properly start the engine. For this purpose I attach the rear end of the spring to the link $e^4$ as originally, but in this instance extend said link through the spring and some distance beyond the end thereof and provide said link with a conical-shaped head $e^{12}$. The front end of this spring is fixed in any desired manner to a sleeve or collar $p$ provided with a flange $p'$. For the purpose of holding said spring I provide a plurality of latches $p^2$, pivoting these to some cross structure of the motor vehicle such as the front axle indicated at $a^3$. Said latches are preferably held together by a small tension spring $p^3$ and may be provided with lugs $p^4$ placed to be engaged by the conical head $e^{12}$, when the spring $e^3$ has been stretched to a predetermined point. Under these conditions said head forces apart the two latches $p^2$ and at the predetermined time causes their hooked ends to disengage the flange $p'$ of the sleeve $p$. The springs $e^3$ being then released exert the necessary unwinding force on the rope or cable $e$, which is attached to it in any desired manner.

It is conceivable that in the case of relatively small, single cylinder engines the springs $e^3$ might be dispensed with, together with the levers F and G and their associated parts. In such a case the link $e^4$ would be connected directly to one end of the cable $e$ and in starting the engine it would be necessary to give a relatively sudden movement to the operating lever E.

Figures 12, 13, 14, 15:
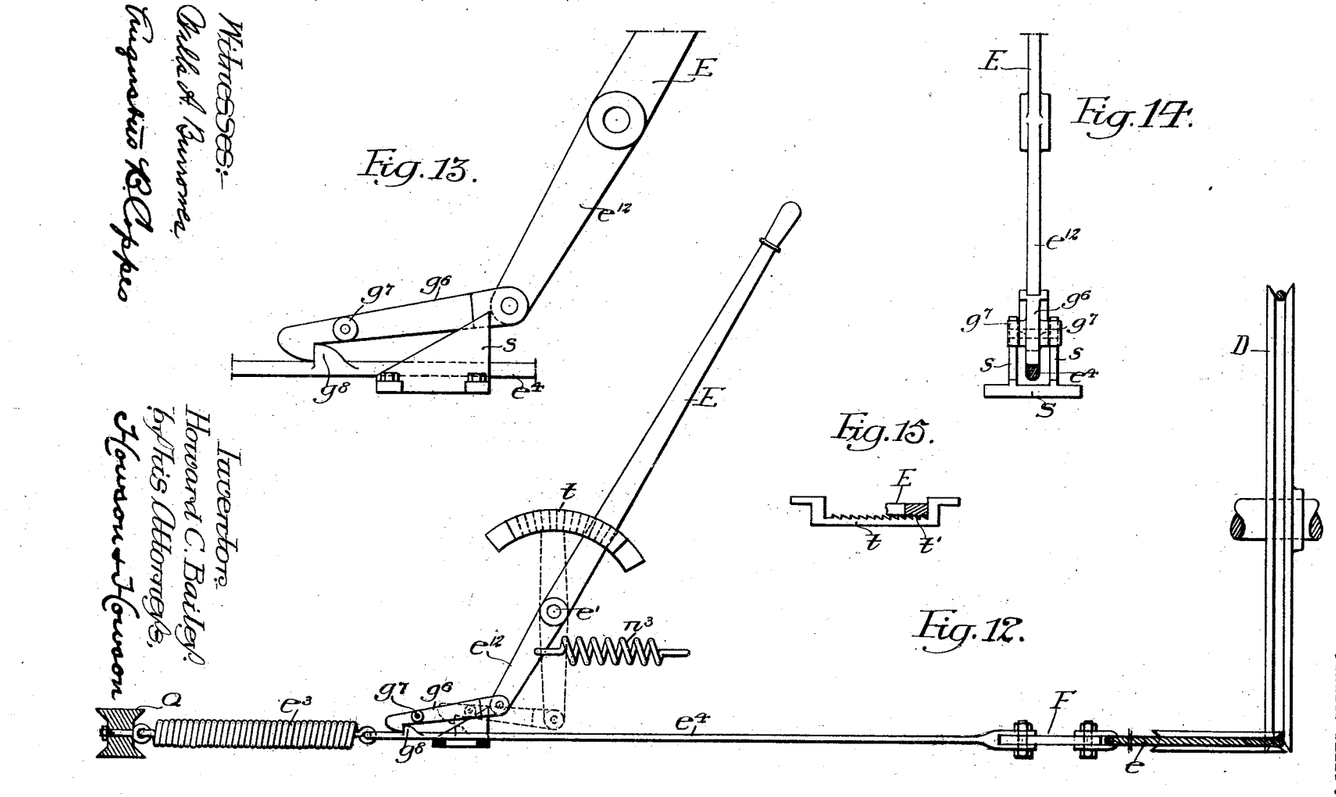

In that form of my invention illustrated in Figs. 12 to 14 inclusive, I have connected the spring $e^3$ between the link $e^4$ and the rear axle Q and have otherwise simplified the apparatus connected thereto. In this case the operating lever has a downwardly extending portion $e^{12}$ to the end of which is pivoted a hooked catch $g^6$. This catch has projecting from either side a roller $g^7$ and is designed to engage with a projection or abutment $g^8$ on the link $e^4$. A spring $n^3$ has one end connected to the downwardly extending part $e^{12}$ of the lever E and its other end fixed to any desired support so as to fulfil the function performed by the spring $n'$ in that form of my device shown in Figs. 9 and 10. As shown in Figs. 13 and 14 a pair of cams $s$ are supported on each side of the links $e^4$ and extend upwardly so as to be engaged by the rollers $g^7$ on the catch $g^6$ whenever the latter is moved toward the front for a sufficient distance. These cams in the present instance form part of a structure S, which may be supported in any desired manner. Under operating conditions when it is desired to start the engine, the upper part of the lever E is moved as before toward the rear, and the catch $g^6$ having been moved into engagement with the projection $g^8$ on the link $e^4$, the spring $e^3$ is put under stress or stretched when the movement of the lever causes said link to be moved forwardly. The spring $d^2$ in this case is arranged to cause revolution of the wheel D so as to take up the slack in the flexible connection or cable $e$, until when the operating lever has been sufficiently moved, the rollers $g^7$ ride upon the cams $s$, thereby turning the catch $g^6$ on its pivot and finally freeing its hooked end from the projection $g^8$, after the spring $e^3$ has been sufficiently stressed. The sudden return of this spring to its normal position then starts the engine, as before described. As heretofore noted, the spring $n^3$ assists the movement of the operating lever E and in order that this latter may be maintained in any desired position when not in use I provide the notched or toothed segment $t$, which is mounted concentrically with the fulcrum $e'$ of said lever, and provide this latter with a tooth $t'$ placed to co-act with said segment.

I claim:—

1. The combination with an explosive engine, of a spring, means for placing said spring under stress, and means for automatically causing the spring to start the engine when it has been stressed to a predetermined extent, substantially as described.

2. The combination with an explosive engine, of a spring, hand operated means for placing said spring under stress, and means for causing the spring to start the engine when it has been stressed to a predetermined extent, substantially as described.

3. The combination with an explosive engine, of a spring, hand operated means for placing said spring under stress, and automatic means for causing the spring to start the engine when said spring has been stressed to a predetermined extent, substantially as described.

4. The combination with an explosive engine, of a tension spring, means for stretching said spring, and means for causing the spring to start the engine after such stretching has reached a predetermined point, substantially as described.

5. The combination with an explosive engine, of a spring, means for stretching said spring, and automatic means for causing the spring to start the engine after such stretching has reached a predetermined point, substantially as described.

6. The combination with an explosive engine, of a spring, having one end connected to the engine shaft, means for holding said end of the spring, means for placing stress on the spring from its other end, and means for releasing the previously held end after the spring has been stressed to a predetermined extent, substantially as described.

7. The combination with an explosion engine, of a pulley connected to the shaft thereof, a spring, a flexible connection capable of being wound upon the pulley and having one end connected to one end of the spring, a device for holding said end to the spring, and means for stretching the spring, with a device for automatically releasing the held end of the spring after the latter has been stretched to a predetermined point, substantially as described.

8. The combination with an explosion engine, of a pulley connected to the shaft of the same, a spring, a flexible connection between one end of the spring and the pulley, a latch for holding the said end of the spring from movement, an operating lever connected to the opposite end of the spring, with a device for moving said latch to release the held end of the spring after the lever has been moved to a predetermined point, substantially as described.

9. The combination with an explosion engine, of a pulley on the shaft of the same, a spring, a flexible connection between one end of the spring and the pulley, a latch for holding said end of the spring from movement, an operating lever connected to the opposite end of the spring, a cam actuated by the lever, and a structure placed to be engaged by said cam so as to operate the latch to release the held end of the spring when the lever has been moved to a predetermined position, substantially as described.

10. The combination with an explosion engine having its shaft in a plurality of sections, of a clutch capable of connecting said sections under predetermined conditions, a spring connected to one of the sections of the engine shaft, means for placing the spring under stress, and means for causing said spring to automatically exert a turning force upon the section of shaft to which it is connected after it has been stretched to a predetermined extent, substantially as described.

11. The combination with an explosion engine having a section of its shaft independent of the remainder of a clutch capable of connecting said independent section with the remainder of the shaft under predetermined conditions, a pulley on said section, a spring tending to maintain said pulley in a predetermined position, a second spring operatively connected to the pulley, means for placing said second spring under stress, and means for causing the second spring to automatically exert a turning force upon the pulley only after it has been stressed to a predetermined point, substantially as described.

12. The combination with an engine having a section of its shaft independent of the remainder, a clutch capable of connecting said independent section with the remainder of the shaft under predetermined conditions, a pulley on said section, a spring tending to maintain said pulley in a predetermined position, a second spring operatively connected to the pulley, means for placing the latter spring under stress, means for causing the said second spring to automatically exert a turning force upon the pulley only after it has been stressed to a predetermined point, and a device for preventing the revolution of the pulley in one direction relatively to one of the shaft sections, substantially as described.

13. The combination with an explosion engine, of a spring, means for placing said spring under stress, means for releasing the compression of the engine, means for causing the spring to start the engine when it has been stressed to a predetermined extent, and means for restoring the compression of the engine after it has been started, substantially as described.

14. The combination with an explosion engine, of a spring, means for placing said spring under stress and simultaneously opening a relief valve or valves on the engine, means for causing the spring to start the engine after it has been stressed to a predetermined extent, and means for closing said relief valves, substantially as described.

15. The combination with an explosion engine, of a spring, means for placing said spring under stress and simultaneously opening a relief valve or valves on the engine, means for causing the spring to start the engine after it has been stressed to a predetermined extent, and automatic means for closing said relief valves, substantially as described.

16. The combination with an explosion engine, of a spring, means for placing said spring under stress, means for causing the spring to start the engine after it has been stressed to a predetermined extent, with a relief valve or valves, means for opening said valve or valves prior to starting the engine, and an automatic device, actuated by gases driven from the cylinder by an explosion, for closing said relief valve or valves, substantially as described.

17. The combination with an explosion engine and means for starting the same, of a normally closed relief valve or valves for said engine, means for opening said valve or valves at will, and mechanism actuated by fluid under pressure delivered from the engine cylinder for automatically returning said valve or valves to the normally closed position when the engine starts.

18. The combination with an explosion engine and a device for starting the same, of a relief valve or valves, means whereby said valve or valves may be opened at will, and an automatic device actuated by products of combustion from the engine cylinder or cylinders capable of closing said valve or valves after the engine is started, substantially as described.

19. The combination with an explosion engine, of a spring, means including an operating lever for placing said spring under stress, means for causing the spring to start the engine after it has been stressed to a predetermined extent, a relief valve or valves for the engine, mechanism connecting the operating lever with said valve or valves for opening them when said lever is moved to start the engine, and automatically acting means for closing said valves after an explosion has occurred in the cylinder, substantially as described.

20. The combination with an explosion engine, of a starting device for the same, means for actuating said starting device, and means for relieving compression in the cylinder or cylinders, the same including a relief valve or valves having a device constantly tending to maintain the same in a closed position, a cup-shaped structure movably supported over the outlet of the valve and capable of actuating said valve to open the same, with means for connecting said actuating structure with the engine starting device, substantially as described.

21. The combination with an explosion engine, of a spring, means including a second spring for placing said first spring under stress, and means for releasing the first spring to permit it to start the engine when it has been stressed to a predetermined extent, substantially as described.

22. The combination with an explosion engine, of a spring, a lever for stretching said spring, a second spring operative on the lever to assist the stretching of said first spring, means for holding one end of the first spring until it has been stressed to a predetermined extent, and a device for releasing said holding means to cause the first spring to start the engine, substantially as described.

23. The combination with an explosion engine, of a spring, means for connecting one end of said spring with the shaft, a lever connected to the other end of the spring for operating the same, means for holding that end of the spring which is connected to the engine shaft until said spring has been stressed to a predetermined extent, a second spring, and a toggle connecting the said second spring to the lever in such manner as to cause it to aid in stretching the first spring, substantially as described.

24. The combination with an explosion engine having its shaft in a plurality of independent sections, of a clutch capable of connecting one of the sections with the main portion of the shaft under predetermined conditions, a pulley on said section, an operating lever, means including a flexible cable for connecting said operating lever with the pulley, means for causing winding of the cable on the pulley when the lever is moved in one direction, and a spring connected to be placed under stress when said lever is so moved, substantially as described.

25. The combination with an explosion engine having a shaft composed of a number of sections, of a clutch capable of connecting one of said sections with the main portion of the shaft under predetermined conditions, a pulley on said section, an operating lever, a second lever connected to said operating lever, and a cable connecting said second lever with the pulley, the point of attachment of said cable to the second lever being farther from the fulcrum thereof than the point of connection of the first lever thereto, substantially as described.

26. The combination with an explosion engine having its shaft in a plurality of sections, of a clutch capable of connecting one section of the shaft with the other under predetermined conditions, a pulley on said section, a cable capable of being wound on said pulley, a guide pulley for directing said cable to one side of the general line of the shaft, an operating lever, a spring connected to assist in the unwinding of said cable from said first pulley and means for connecting said operating lever with the cable.

27. The combination of a frame, an explosion engine mounted thereon, and provided with a shaft made in a plurality of sections, means for connecting one of the sections to another section under predetermined conditions, a pulley on said section, a cable capable of being wound on said pulley, a lever mounted on the frame and connected to said cable, a guide pulley for directing the cable to said lever, an operating lever and means for connecting said operating lever to the first lever at a point nearer the fulcrum thereof than the point of connection of the cable thereto, substantially as described.

28. The combination with an explosion engine, of starting means therefor including a pulley, an operating lever, means including a cable connecting the pulley and the lever, a spring acting on the pulley and arranged to cause the cable to be wound thereon, when the lever is moved into a predetermined position, with a second spring connected to assist in moving the lever from such position when the engine is started, substantially as described.

29. The combination with an explosion engine, of starting means therefor including a pulley, an operating lever, means including a cable connecting the pulley and the lever, and a spring connected to the lever so as to be stressed when said lever is moved into a position permitting the cable to be wound on the pulley, substantially as described.

30. The combination of an internal combustion engine and starting means therefor, including a member to which power may be applied for actuating said starting means to give a preliminary revolution to the engine, and a spring connected to be placed under stress preparatory to the starting of the engine, said spring being arranged to deliver the energy stored in it so as to provide a portion of the power for operating the actuating member when the engine is to be started.

In testimony whereof, I have signed my name to this specification, in the presence of two subscribing witnesses.

HOWARD C. BAILEY.

Witnesses:
ARTHUR J. PURSSELL,
WILLIAM E. BRADLEY